United States Patent

Havinis et al.

[11] Patent Number: 6,167,266
[45] Date of Patent: Dec. 26, 2000

[54] METHOD FOR HANDLING OF POSITIONING TRIGGERS FOR BATCH LOCATION REQUESTS WITHIN A LOCATION SERVICES SYSTEM

[75] Inventors: Theodore Havinis; Maya Roel-Ng, both of Plano, Tex.

[73] Assignee: Ericsson Inc., Research Triangle Park, N.C.

[21] Appl. No.: 09/086,889

[22] Filed: May 29, 1998

[51] Int. Cl.[7] .................................................. H04Q 7/20
[52] U.S. Cl. .......................... 455/433; 455/432; 455/435; 455/436
[58] Field of Search .................................. 455/433, 432, 455/435, 436, 412, 413, 414, 456, 404, 553

[56] References Cited

U.S. PATENT DOCUMENTS

| | | | |
|---|---|---|---|
| 5,497,412 | 3/1996 | Lannen et al. | 379/60 |
| 5,519,760 | 5/1996 | Borkowski et al. | 379/59 |
| 5,666,662 | 9/1997 | Shibuya | 455/456 |
| 5,918,159 | 7/1999 | Fomukong et al. | 455/38.1 |
| 5,991,620 | 11/1999 | Kingdon et al. | 455/432 |
| 6,002,932 | 12/1999 | Kingdon et al. | 455/433 |
| 6,002,936 | 12/1999 | Roel-Ng et al. | 455/456 |

FOREIGN PATENT DOCUMENTS

92/10069  11/1992  WIPO .............................. H04Q 7/04

OTHER PUBLICATIONS

Rao et al. (Wireless Networks, vol. 1, pp. 83–93) Interworking between Digital European Cordless Telecommunication and a distributed packet switch, Jan. 17, 1994.

*Primary Examiner*—Daniel S. Hunter
*Assistant Examiner*—Pablo Tran
*Attorney, Agent, or Firm*—Jenkens & Gilchrist, P.C.

[57] ABSTRACT

The present invention discloses a method for processing positioning triggers for batch location requests in a location services system. A location authority transmits a batch location request to a positioning gateway which forwards requests to arm or disarm positioning triggers associated with particular subscribers. The positioning trigger associated with the batch location request is added or removed from the HLR record of the subscriber. Next, the positioning trigger is either armed or disarmed at the MSC/VLR of the subscriber.

20 Claims, 6 Drawing Sheets

METHOD FOR HANDLING OF POSITIONING TRIGGERS FOR BATCH LOCATION REQUESTS WITHIN A LOCATION SERVICES SYSTEM

BACKGROUND OF THE INVENTION

1. Technical Field of the Invention

The present invention relates to telecommunications systems and methods for determining the location of a mobile terminal within a cellular network, and more particularly, to a method for processing positioning triggers for batch location requests from a location service.

2. Description of Related Art

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
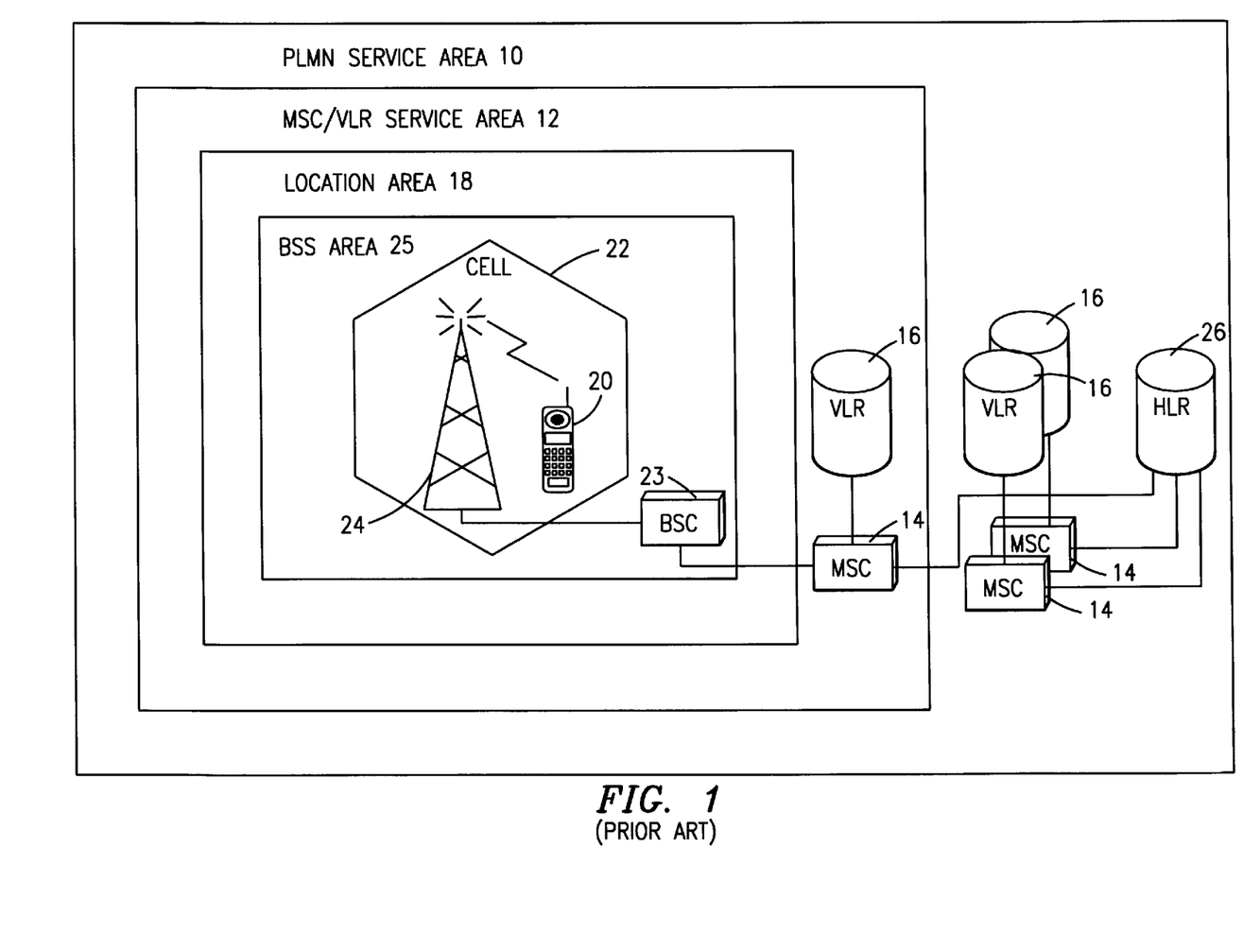
FIG. 1 is a block diagram of a conventional terrestrial based wireless telecommunication system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I service".

Figure 2:
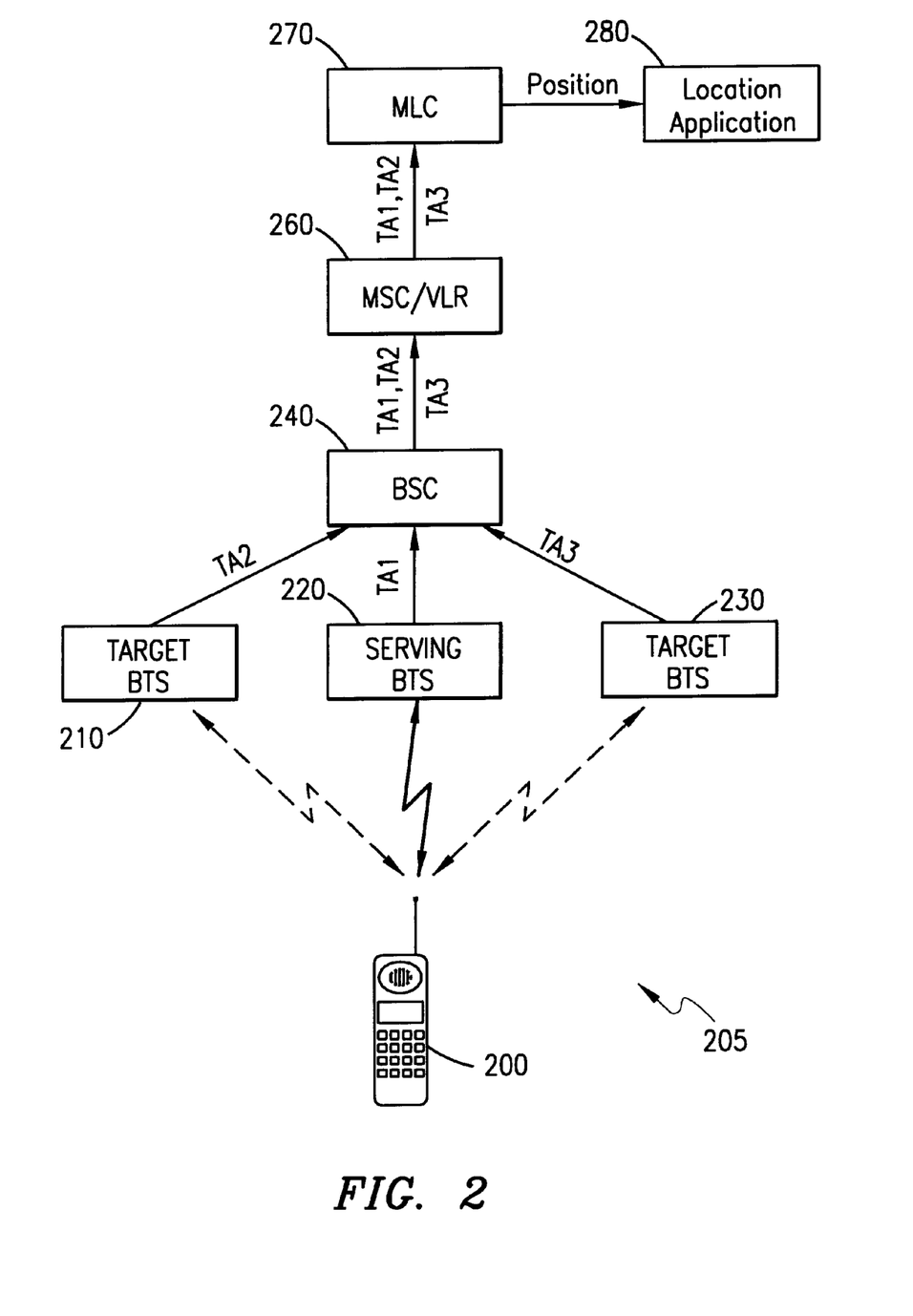
FIG. 2 illustrates a sample positioning handover in which positioning data is acquired by a target based transceiver station and transmitted to a serving base station controller.

As can be seen in FIG. 2 of the drawings, upon a network positioning request, the Base Station System (BSS) (220 and 240) serving the MS 200 to be positioned generates positioning data, which is delivered to the MSC 260. This positioning data is then forwarded to a Mobile Location Center (MLC) 270 for calculation of the geographical location of the MS 200. The location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node.

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD)

between the time a BTS 220 sends out a signal and the time the MS 200 receives the signal. This time difference information can be sent to the MLC 270 for calculation of the location of the MS 200. Alternatively, the MS 200, with knowledge of the location of the BTS 220, can determine its location.

In order for a location application to subscribe to a location service provided by a wireless operator, a location application profile must be created for the location application. In order to use the service, the location application must transmit a location requests to the positioning gateway. There are two types of location requests, interactive and batch. Batch location requests include positioning triggers defining events for triggering the determination of the position of a subscriber. Improved methods for processing these positioning triggers would greatly improve the quality of the location services.

SUMMARY OF THE INVENTION

The present invention overcomes the foregoing and other problems with a method for handling positioning triggers for batch location requests in a location services system. A location application transmits batch location requests to a positioning gateway requesting the addition or removal of positioning triggers in association with a number of subscribers. Upon receipt of the batch location requests, the positioning gateway determines whether or not the location application is authorized to make the batch location requests.

Upon confirmation of authorization, a message is forwarded from the positioning gateway to HLR associated with each subscriber in the batch location requests. This message includes information enabling the positioning trigger, subscription override key and positioning gateway address to be stored within a HLR record associated with the subscriber is to be armed. In the case of a removal of a positioning trigger, this message causes an existing positioning trigger to be removed from the HLR record of the subscriber and subsequently from the serving MSC/VLR.

A message is then transmitted from the HLR of the subscriber to the MSC/VLR serving the subscriber. This message either causes the arming of a positioning trigger for a subscriber by storing information concerning the positioning trigger in the MSC/VLR record of the subscriber or the removal of a positioning trigger information from the MSC/VLR record of the indicated subscriber. Once the positioning trigger has either been armed or disarmed at the MSC/VLR of the subscriber, an acknowledgment message is transmitted from the MSC/VLR to the HLR of the subscriber and then from the HLR of the subscriber to the positioning gateway. In this manner, the subscribers may monitor for the occurrences of positioning triggers and notify the positioning gateway upon their occurrence.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 3:
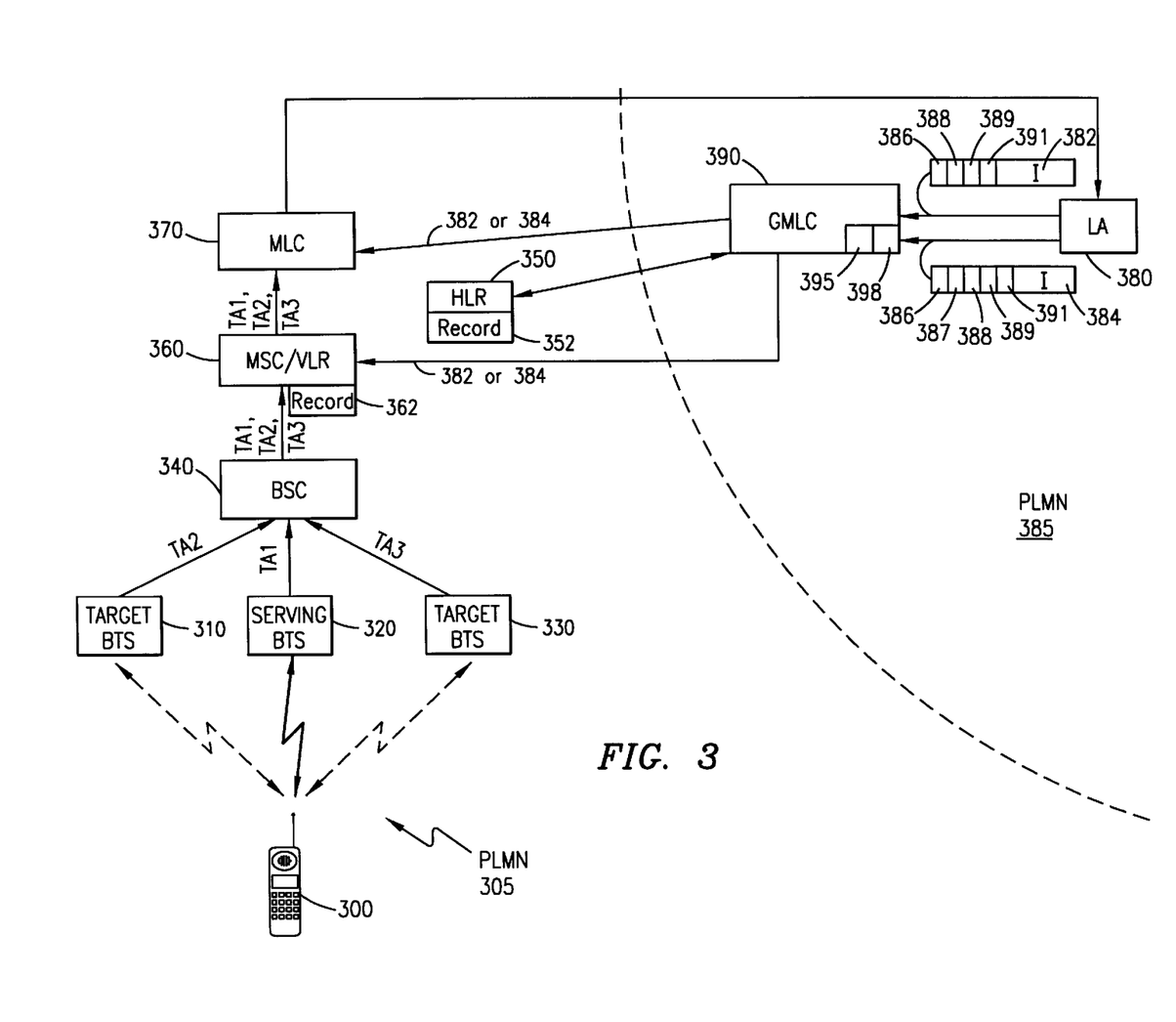
FIG. 3 illustrates positioning of at least one mobile terminal by a location application (LA)

Referring now to the Drawings, and more particularly, to FIG. 3, wherein there is described the interaction between a requesting local application and a gateway mobile location center. Prior to sending a positioning request a requesting Location Application (LA) 380 must first register with a Gateway Mobile Location Center (GMLC) 390 and define within, for example, a database 398 within the GMLC 390 its location services profile, e.g., all of the relevant service parameters specific to that LA 380. For example, the LA 380 can define whether the LA 380 has the authority to initiate an interactive positioning request 382, a batch mode positioning request 384 or both. In addition, the LA 380 can define whether the LA 380 has the authority to override privacy settings of all subscribers, as in the case of an emergency center, or particular subscribers, as in the case of a law enforcement agency. Furthermore, the LA 380 can define whether the LA 380 is associated with a group of subscribers, e.g., a fleet management company, and the particular Mobile Station International Subscriber Directory Number's (MSISDN's) associated with that group. The MSISDN is the digit string associated with a particular Mobile Station (MS) 300.

Once the LA 380 has defined the service parameters 398 specific to that LA 380, the GMLC 390 assigns a Location Application Identifier Number (LAIN) 386, which identifies the particular LA 380 and the associated service parameters 398. Thereafter, the requesting LA 380 can send its LAIN 386 in either an interactive positioning request 382 or a batch mode positioning request 384 for a particular MS 300 or a group of MS's 300 to the GMLC 390, which is the GMLC 390 for the Public Land Mobile Network (PLMN) 385 where the LA 380 is located. An interactive positioning request 382 is performed immediately upon verification of authorization, using the service parameters 398 defined by the LA 380, while a batch mode positioning request 384 is performed only upon the occurrence of an event defined by the LA 380 when the batch mode positioning request 384 is sent.

If the positioning request is an interactive positioning request 382, the LA 380 must include the LAIN 386 and the MSISDN(s) 388 to be positioned and quality of service information 381. If, the LA 380 is a group-related application, a group ID associated with the MSISDN's to be positioned can be sent with the positioning request. The GMLC 390 can then cross-reference the group ID with the LAIN 386 and verify that the specified MSISDNs 388 associated with the MSs 300 to be positioned belong to the specified group ID to ensure that the LA 380 has the authority to position those MS's 300.

In addition, the LA 380 can also include a number of optional service parameters 389 along with the interactive positioning request 382, together with the mandatory LAIN 386, MSISDN(s) 388 associated with the MS(s) 300 to be positioned and quality of service information 381. For example, if the LA 380 is a group-related application, a requesting identifier number may also need to be included to identify the particular person who is requesting the positioning of the MS's 300 within the group. As an example, if the LA 380 is a fleet management system, where numerous employees have access to the system that initiates the positioning requests, certain employees may not have access to the system, or may only have limited access to the system, e.g., only certain MS's 300 within the group can be positioned by that employee. Thus, when the fleet management company defines its service parameters 398, it can require the inclusion of a requesting identifier number in the interactive positioning request 382 in order to prevent unauthorized positioning of the MS's 300 within the fleet management system group.

Another optional service parameter 389, which can be included along with the interactive positioning request 382, is a called-party number, which can be used by the GMLC 390 to verify whether or not the particular MS 300 to be positioned currently has a connection with that called-party number. For example, if the LA 380 is a taxi dispatch service, and a subscriber has called that taxi service requesting a taxi, but is unsure of his or her current location, the taxi dispatch service can initiate a positioning request for the MS 300 associated with that subscriber in order to send a taxi to that subscriber's location. If the taxi dispatch service defined its location services profile 398 such that the positioning of a MS 300 can only be performed if that MS 300 has a call connection to the number associated with the taxi service, the taxi dispatch service can include the called-party number, which is the digit string associated with the taxi dispatch service, in the interactive positioning request 382. In addition, the taxi dispatch service can also include a calling-party number, which is the MSISDN associated with the MS 300 of the subscriber requesting the taxi. Therefore, by using the called-party number and calling-party number, the GMLC 390 can determine whether the MS 300 to be positioned has a call connection to the taxi company, and thus, whether the LA 380 has the authority to position that MS 300.

In some situations, the MS 300 may have a call connection to a third party, e.g., a service which provides transportation to subscribers who have been drinking, which is relaying the request for taxi service to the taxi dispatch service. In that case, a redirected number can also be included along with the called-party number and calling-party number in the interactive positioning request 382.

Finally, the LA 380 can include optional conditions 391 in the interactive positioning request 382. For example, the LA 380 can specify that the positioning should only be performed if the MS 300 is within a certain geographical area, e.g., a cell, location area, local access transport area, Mobile Switching Center area, state, or country. In addition, the LA 380 can specify that the positioning should only be performed if the MS 300 is in a particular state, e.g., connected to a particular number, as described in the taxi example hereinbefore. It should be understood that many other types of conditions 391 and/or optional service parameters 389 can be included in the interactive positioning request 382, depending upon the needs of the particular LA 380.

If the positioning request is a batch mode positioning request 384, the LA 380 must include its LAIN 386, the quality of service information 381 and a particular event 387 which must occur for positioning to be performed. The MSISDN(s) 388 associated with the MS(s) to be positioned are also typically required to be included in the batch mode positioning request 384. However, if the LA 380 is an emergency center, the emergency center can define the event 387 as position any MS 300 that dials "911", regardless of the MSISDN 388 or whether the particular MS 300 has an MSISDN 388 (in the case where service for the MS 300 has not yet been activated). In that case, when an MS 300 dials "911", a Mobile Switching Center/Visitor Location Register (MSC/VLR) 360 serving the area 305 that the MS 300 is in triggers the positioning request in a serving Mobile Location Center (MLC) 370, and positioning of the MS 300 is performed. Thus, the emergency call can be routed to the appropriate Public Safety Answering Point (PSAP) (not shown) and emergency services can be dispatched to the current location of the MS 300.

The event 387 which triggers positioning of the MS 300 can range from a call originated by the MS 300 to a location update performed by the MS 300. For example, if the MS 300 has a location-based charging service plan, every time the MS 300 places a call, positioning of the MS 300 is performed to determine the amount to charge the subscriber for the call. In this case, the LA 380 would send a batch mode positioning request 384 for the MSISDN 388 associated with the MS 300 to be positioned and an indication (event 387) that positioning is to be performed only when the MS 300 originates a call. In an alternative embodiment, the LA 380 can specify (define the event 387) that positioning of the MS 300 is only performed when a mobile terminating call occurs, e.g., the MS 300 receives a call.

In addition, the triggering event 387 can be a Short Message Service (SMS) message sent from or to the MS 300. Alternatively, the event 387 could be an Unstructured Supplementary Service Data (USSD) message, a Call Independent Supplementary Service (CISS) message or a Location Update message. Furthermore, as discussed hereinbefore, an emergency center can send a positioning request without an indication of the MSISDN 388 to the GMLC 390 and request (include an event 387) positioning to be performed only when the MSC/VLR 360 receives a "911" call.

It should, therefore, be understood that any triggering event 387 can be defined by the LA 380, and only upon the occurrence of the event 387, is the MS 300 positioned. Alternatively, the LA 380 can define a series of events 387 to occur before positioning is performed. For example, the LA 380 can define the events 387 such that upon the occurrence of a specified event 387, the LA 380 is notified of the occurrence, and the LA must then send a message, such as "proceed with the positioning," for positioning to occur. If, for example, the first event 387 is the performance of a location update (either periodic or when the MS 300 actually enters into a new location area), the GMLC 390 can notify the LA 380 that a location update has occurred. Thereafter, if the LA 380 desires positioning to be performed, the LA 380 can send a message, such as "proceed with the positioning," to the GMLC 390, which is the second event 387 defined by the LA 380 for positioning to occur.

Optional service parameters 389 can also be included in the batch mode positioning request 384, such as the requesting identifier number, as described hereinabove. In addition, conditions 391 can be included, such as the location of the MS 300 or the state of the MS 300, e.g., call connected.

Figure 4:
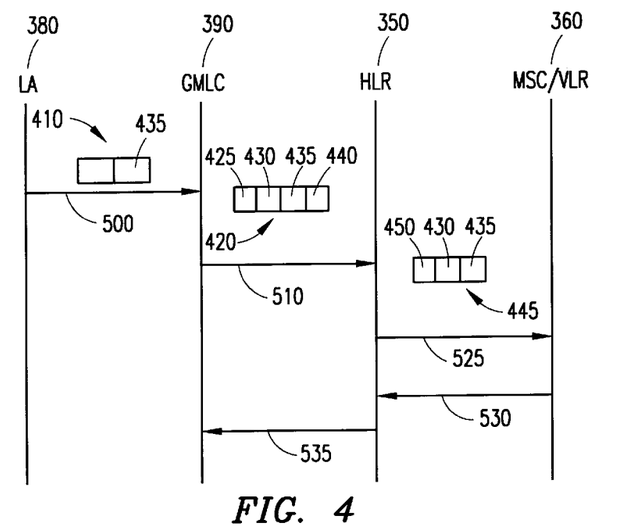
FIG. 4 is a signaling diagram illustrating the storing and arming of positioning triggers in response to a batch location request from a location authority.
Figure 5:
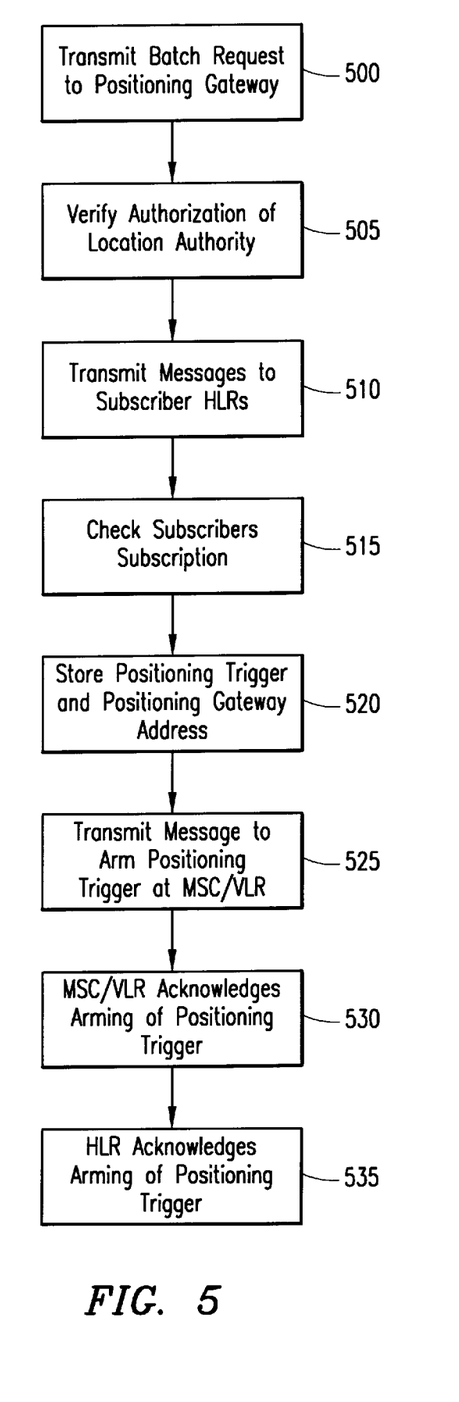
FIG. 5 is a flow diagram illustrating the storing and arming of positioning triggers in response to a batch location request from a location authority.

Referring now to FIGS. 4 and 5, there are shown a signal flow diagram and flow chart illustrating the manner for storing and arming positioning triggers in response to a batch location requests from the location authority 380. For batch location requests, the location application 380 specifies a positioning trigger (event) that will trigger the positioning of one or more mobile stations 300. A location application 380 initially transmits at step 500 a batch request to a positioning gateway (in a GSM system the positioning gateway is called the gateway mobile location center (GNLC)) 390. The batch request 410 includes a position trigger 415 that will trigger a positioning of a specified mobile station 300. The positioning gateway 390 verifies at step 505 that the location application 380 is authorized to request the batch location service for the specified subscribers at step 505. After authorization, the positioning gateway sends at step 510 a message 420 to the HLR 350 of the subscribers indicated within the batch request 410. While FIG. 4 only illustrates a transmission being made to a single HLR 350, it should be understood that a transmission is made to each HLR for each subscriber included within the batch.

The message 420 transmitted to the HLR 350 includes the directory number 425 of the subscriber (the MSISDN in a GSM system), a positioning gateway address 430, a positioning trigger 435 and the subscription override key information 440. The subscription override key information 440 indicates whether the check of subscription key location services must be performed before scoring and arming the position trigger. The HLR 350 checks the subscriber subscription to location services at step 515 as indicated by the subscription override key. If the check is successful, the HLR 350 stores the positioning trigger 435 and the positioning gateway address 430 within the subscribers HLR record 352.

The HLR 350 next transmits a message at step 525 to the subscribers serving MSC/VLR 360 to arm the positioning trigger. The message 445 includes the subscriber identity 450 (the IMSI number in a GSM system), the positioning gateway address 430 and the positioning trigger 435. The serving MSC VLR 360 acknowledges the arming of the positioning trigger to the HLR 350 at step 530 and the HLR acknowledges the arming of the positioning trigger to the positioning gateway 390 at step 535.

Figure 6:
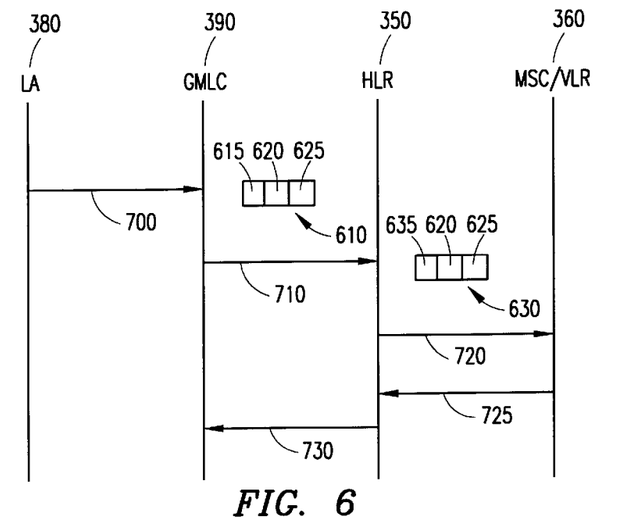
FIG. 6 is a signal flow diagram illustrating the removal and disarming of positioning triggers in response to a batch location request from a location authority.
Figure 7:
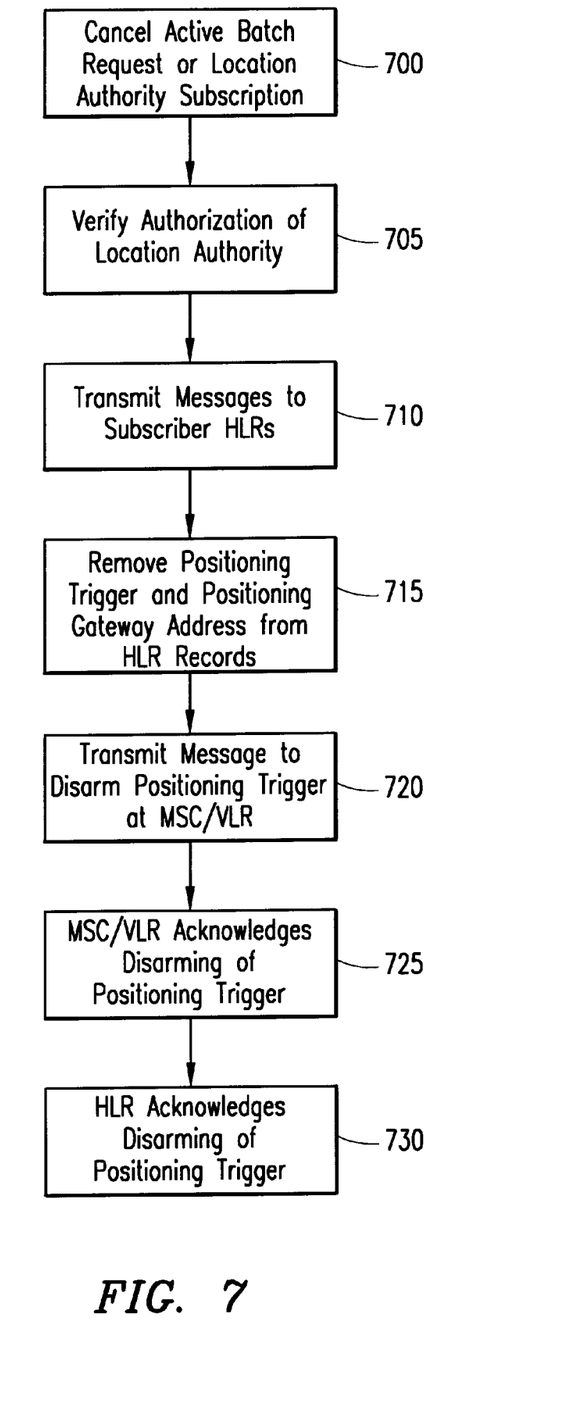
FIG. 7 is a flow diagram illustrating the removal and disarming of positioning triggers in response to a batch location request from a location authority.

Referring now to FIGS. 6 and 7, there are illustrated a signaling diagram and flow chart more fully describing the method by which a position trigger may be removed and disarmed from subscribers within an active batch request. A location application 380 can request the positioning gateway 350 cancel an active batch location request. The location application 380 generates a request at step 700 to the positioning gateway 350 to cancel an active batch request or to order the termination of the location authority subscription to local services. The positioning gateway 350 verifies at step 705 that the location authority 380 is authorized to request cancelization and transmit at a message 610 at step 710 to the subscriber HLR 350 for each subscriber including in the batch request. This message 610 contains the subscriber's directory number 615 (the MSISDN in a GSM system), the address of the positioning gateway 620 and the positioning trigger 625.

In response to this message 610, the HLR 350 removes the positioning trigger 625 and the positioning gateway address 620 from the subscriber HLR record 352 at step 715. The HLR 350 then transmits a message 630 at step 720 to the subscriber serving MSC/VLR 360 to disarm the indicated positioning trigger 625. The message 630 contains the subscriber's identity 635 (the IMSI in a GSM system), the address of the positioning gateway 620 and the positioning trigger 625. For a GSM system, a delete subscriber data message containing the positioning trigger information may be used to update the subscriber's VLR record. The serving MSC/VLR 360 acknowledges the disarming of the positioning trigger at step 725 to the HLR 350, and the HLR acknowledges the removal and disarming of the positioning trigger to the positioning gateway 390 at step 730.

Figure 8:
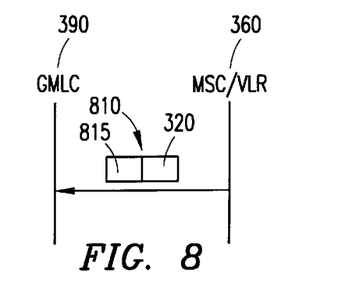
FIG. 8 is a signal flow diagram illustrating the detection of a positioning trigger occurring within a subscriber.

Referring now to FIG. 8, there is illustrated the manner in which the positioning gateway 390 is notified of a batch request triggering event by the MSC/VLR 360. When the MSC/VLR 360 detects that a subscriber is involved in an event indicated as a triggering event in the subscriber's VLR record 362, the MSC/VLR 360 transmits a message at 800 to the positioning gateway 390 indicated within the VLR record 362 informing the positioning gateway of the event occurrence. This message 810 includes the subscribers directory number 815 (the MSISDN in a GSM system) and the positioning trigger 320. The positioning gateway 390 must then determine if positioning should occur for the subscriber.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

For example, it should be noted that the location services can be used by applications located-in or connected to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A method for processing positioning triggers for batch location requests in a location services system, comprising the steps of:

receiving a batch location request from a location authority at a positioning gateway, the batch location request having a positioning trigger associated therewith;

updating a position trigger within an HLR record of at least one subscriber associated with the batch location request in response to the batch location request;

configuring a position trigger in an MSC/VLR of the at least one subscriber in response to the batch location request; and operating the at least one subscriber according to the configuration of the position trigger in the MSC/VLR.

2. The method of claim 1, wherein the step of updating further comprises the step of storing the positioning trigger within an HLR record of the at least one subscriber.

3. The method of claim 2, wherein the step of configuring further comprises the step of arming the positioning trigger in the MSC/VLR of the at least one subscriber.

4. The method of claim 1, wherein the step of updating further comprises the step of removing the positioning trigger from the HLR record of the at least one subscriber.

5. The method of claim 4, wherein the step of configuring further comprises the step of disarming the positioning trigger in the MSC/VLR of the at least one subscriber.

6. The method of claim 1 further including the step of verifying the authority of the location authority to provide the batch location request.

7. The method of claim 1 further including the step of transmitting a message from the positioning gateway to the HLR in response to the positioning trigger included in the batch location request.

8. The method of claim 1 further including the steps of:
acknowledging the configuring of the position trigger to the HLR; and
acknowledging the configuring of the position trigger to the positioning gateway.

9. The method of claim 1 further including the step of:
determining whether checking of subscription to location services must be done, based on a received value of a subscription override key.

10. The method of claim 1, wherein the steps of operating further includes the steps of:
detecting occurrence of a positioning trigger at the subscriber; and
notifying the positioning gateway of occurrence of the positioning trigger.

11. A method for handling positioning triggers for batch location requests in a location services system, comprising the steps of:
receiving at a positioning gateway a batch location request including a positioning trigger from a location authority;
transmitting a message from the positioning gateway to an HLR of at least one subscriber associated with the batch location request;
storing the positioning trigger of the batch location request within an HLR record for the at least one subscriber;
transmitting a message from the HLR to an MSC/VLR of the at least one subscriber; and
arming the positioning trigger for the at least one subscriber of the MSC/VLR in response to the message from the HLR.

12. The method of claim 11 further including the step of verifying the authority of the location application to provide the batch location request.

13. The method of claim 11 further including the steps of:
acknowledging the arming of the positioning trigger to the HLR; and
acknowledging the arming of the positioning trigger to the positioning gateway.

14. The method of claim 11, wherein the message transmitted from the positioning gateway to the HLR includes at least one of an identification for the subscriber, an address of the positioning gateway, the positioning trigger and subscriber override key information.

15. The method of claim 11, wherein the message transmitted from the HLR to the MSC/VLR includes at least one of a subscriber identifier, an address of the positioning gateway and the positioning trigger.

16. A method for handling positioning triggers for batch location requests in a location services system, comprising the steps of:
receiving at a positioning gateway a batch location request including a positioning trigger from a location authority;
transmitting a message from the positioning gateway to an HLR of at least one subscriber associated with the batch location request;
removing the positioning trigger of the batch location request from an HLR record for the at least one subscriber;
transmitting a message from the HLR to an MSC/VLR of the at least one subscriber; and
disarming the positioning trigger for the at least one subscriber of the MSC/VLR in response to the message from the HLR.

17. The method of claim 16 further including the step of verifying the authority of the location authority to provide the batch location request.

18. The method of claim 16 further including the steps of:
acknowledging the disarming of the positioning trigger to the HLR; and
acknowledging the disarming of the positioning trigger to the positioning gateway.

19. The method of claim 16, wherein the message transmitted from the positioning gateway to the HLR includes at least one of an identification for the subscriber, an address of the positioning gateway, the positioning trigger and subscriber override key information.

20. The method of claim 16, wherein the message transmitted from the HLR to the MSC/VLR included at least one of a subscriber identifier, address of the positioning gateway and the positioning trigger.

* * * * *